(12) United States Patent
Tosun et al.

(10) Patent No.: US 11,170,526 B2
(45) Date of Patent: Nov. 9, 2021

(54) METHOD AND APPARATUS FOR ESTIMATING TOOL TRAJECTORIES

(71) Applicant: SAMSUNG ELECTRONICS CO., LTD., Suwon-si (KR)

(72) Inventors: Tarik Tosun, Brooklyn, NY (US); Eric Mitchell, Stanford, CA (US); Ben Eisner, New York, NY (US); Jinwook Huh, Millburn, NJ (US); Bhoram Lee, Princeton, NJ (US); Daewon Lee, Princeton, NJ (US); Volkan Isler, Saint Paul, MN (US); Sebastian Seung, Princeton, NJ (US); Daniel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 69 days.

(21) Appl. No.: 16/725,672

(22) Filed: Dec. 23, 2019

(65) Prior Publication Data
US 2020/0311969 A1 Oct. 1, 2020

Related U.S. Application Data

(60) Provisional application No. 62/824,200, filed on Mar. 26, 2019.

(51) Int. Cl.
*G06T 7/73* (2017.01)
*G06T 7/38* (2017.01)

(52) U.S. Cl.
CPC .............. *G06T 7/73* (2017.01); *G06T 7/38* (2017.01); *G06T 2207/20081* (2013.01); *G06T 2207/30241* (2013.01); *G06T 2207/30244* (2013.01)

(58) Field of Classification Search
CPC .... G06T 7/20; G06T 7/38; G06T 7/70; G06T 7/73; G06T 7/75; G06T 2207/20081; G06T 2207/20084; G06T 2207/30241; G06K 9/00201; G06K 9/00214; B25J 9/161; B25J 9/163; B25J 9/1664; G06N 3/02; G06N 3/04; G06N 20/00
See application file for complete search history.

(56) References Cited

U.S. PATENT DOCUMENTS

| | | | |
|---|---|---|---|
| 8,442,307 B1 | 5/2013 | Anati et al. | 382/154 |
| 10,131,053 B1 | 11/2018 | Sampedro et al. | B25J 9/1666 |
| 2015/0165623 A1 | 6/2015 | Kange | B25J 9/163 |
| 2017/0091996 A1 | 3/2017 | Wei et al. | G06T 17/20 |
| 2017/0333137 A1 | 11/2017 | Roessler | A61B 34/20 |
| 2019/0184561 A1 | 6/2019 | Yip et al. | B25J 9/1666 |
| 2019/0380278 A1* | 12/2019 | Burden | B25J 9/1005 |
| 2020/0023516 A1* | 1/2020 | Kato et al. | G05B 19/425 |
| 2020/0086485 A1* | 3/2020 | Johnson et al. | G06Q 10/06316 |
| 2020/0114506 A1* | 4/2020 | Toshev et al. | B25J 9/1697 |
| 2021/0081791 A1* | 3/2021 | Goodrich et al. | G05B 19/4155 |

* cited by examiner

*Primary Examiner* — Andrew W Johns
(74) *Attorney, Agent, or Firm* — Sughrue Mion, PLLC

(57) ABSTRACT

An apparatus for estimating a trajectory of a tool may include: a memory storing instructions; and a processor configured to execute the instructions to: receive a task to be performed by the tool on a target object; receive a grayscale image and a depth image of the target object; and estimate a tool trajectory for performing the task, from the grayscale image and the depth image, via a pixels-to-plans neural network that is trained based on a labeled tool trajectory that is generated from a point cloud model of the target object.

24 Claims, 14 Drawing Sheets

METHOD AND APPARATUS FOR ESTIMATING TOOL TRAJECTORIES

CROSS-REFERENCE TO RELATED APPLICATION

This application claims priority under 35 U.S.C. § 119 from U.S. Provisional Application No. 62/824,200 filed on Mar. 26, 2019 in the U.S. Patent & Trademark Office, the disclosure of which is incorporated herein by reference in its entirety.

FIELD

Methods and apparatuses consistent with embodiments relate to controlling a tool to perform a task on an object based on a deep learning architecture, and more particularly, estimating a trajectory of the tool based on an RGB-D image of the object, using a deep learning architecture.

BACKGROUND

Despite many advances in robotic manipulation in industrial settings, manipulating general objects in unstructured environments remains challenging. A traditional approach for manipulation relies on a sense-plan-act paradigm which decouples the following three components: (1) capturing images of an object and generating an intermediate geometric representation of the object using the images ("sense"), (2) generating a movement path of the tool based on the intermediate geometric representation ("plan"), and (3) executing the movement path ("act"). For example, a camera/sensing module, a trajectory planner, and a path-following controller may be used to perform the sensing, planning, and acting, respectively.

Decoupling these components allows for independent progress in complementary areas, but hand-designing the interface between the camera module, the trajectory planner, and the path-following controller can introduce brittleness at the system level. For example, even though the trajectory planner can effectively generate a trajectory when a complete three-dimensional model and the pose of the object are given, it might be too difficult for the camera/sensing module to generate a precise three-dimensional (3D) model and pose for a given input image.

Related pixels-to-actions methods have been introduced in addressing the challenges posed by rigid interfaces. Rather than requiring an explicit intermediate representation, pixels-to-actions methods estimate effective actions in the form of joint angles or torques, directly from raw sensor data, without any explicit intermediate state. However, the pixels-to-actions techniques often suffer from both high sample complexity and brittleness in the presence of deviations from the learning environment, which are particularly significant in robotic applications. Further, in the pixels-to-actions methods, the direct coupling of sensor input to controller actions may be too restrictive and leads to bad generalization performance.

SUMMARY

According to an aspect of the disclosure, an apparatus for estimating a trajectory of a too may include: a memory storing instructions; and a processor configured to execute the instructions to: receive a task to be performed by the tool on a target object; receive a grayscale image and a depth image of the target object; and estimate a tool trajectory for performing the task, from the grayscale image and the depth image, via a pixels-to-plans neural network that is trained based on a labeled tool trajectory that is generated from a three dimensional (3D) model of the target object.

The pixels-to-plans neural network may include at least one convolutional layer and at least one fully connected layer, and the processor may be further configured to execute the instructions to: process the grayscale image and the depth image through the at least one convolutional layer and the at least one fully connected layer to obtain the estimated tool trajectory.

The pixels-to-plans neural network may include: a first dense convolutional network configured to receive and process the grayscale image, and a second dense convolutional network configured to receive and process the depth image, wherein the first dense convolutional network and the second dense convolutional network may process the grayscale image and the depth image in separate streams.

The pixels-to-plans neural network may further include: a concatenation layer that combines first features output from the first dense convolutional network and second features output from the second dense convolutional network; and a fully connected layer configured to process the combined first and second features to output the estimated tool trajectory.

The fully connected layer may include a plurality of hidden layers coupled with a rectified linear unit (ReLU) activation function.

The pixels-to-plans neural network may be trained until a difference between the estimated tool trajectory and the labeled tool trajectory becomes less than a predetermined threshold value.

The labeled tool trajectory may be generated from the point cloud model of the target object by a 3D motion planner.

The 3D motion planner may be configured to generate the labeled tool trajectory using a rapidly exploring random tree (RRT) algorithm.

The 3D model of the target object may be a point cloud model of the target object, and the 3D motion planner may be configured to generate the labeled tool trajectory based on the point cloud model of the target object, a 3D model of the tool, a target position for the tool with respect to the target object, and a pose of the target object.

The estimated tool trajectory may be a tool trajectory from a position of a camera that captures the grayscale image and the depth image, wherein the processor may be further configured to execute the instructions to: receive a camera-to-tool calibration value that indicates a relative position of the camera in relation to a position of the tool, and transform the tool trajectory in a camera frame to a tool trajectory in a tool frame, based on the camera-to-tool calibration value.

According to an aspect of the disclosure, a method for estimating a trajectory of a tool may include: receiving a task to be performed by the tool on a target object; receiving a grayscale image and a depth image of the target object; and estimating a tool trajectory for performing the task, from the grayscale image and the depth image, via a pixels-to-plans neural network that is trained based on a labeled tool trajectory that is generated from a three dimensional (3D) model of the target object.

The pixels-to-plans neural network may include at least one convolutional layer and at least one fully connected layer, and the estimating the tool trajectory may include the estimating the tool trajectory by processing the grayscale image and the depth image through the at least one convolutional layer and the at least one fully connected layer.

The pixels-to-plans neural network may include: a first dense convolutional network and a second dense convolutional network. The estimating the tool trajectory may include: inputting the grayscale image to the first dense convolutional network; inputting the depth image to the second dense convolutional network; and processing the grayscale image and the depth image through the first dense convolutional network and the second dense convolutional network, respectively, in separate streams.

The pixels-to-plans neural network may further include: a concatenation layer and a fully connected layer. The estimating the tool trajectory may further include: inputting first features output from the first dense convolutional network and second features output from the second dense convolutional network, to the concatenation layer; combining the first features and the second features; and inputting the combined first and second features to the fully connected layer and processing the combined first and second features by the fully connected layer to output the estimated tool trajectory.

The processing the combined first and second features by the fully connected layer may include processing the combined first and second features using a plurality of hidden layers coupled with a rectified linear unit (ReLU) activation function.

The pixels-to-plans neural network may be trained until a difference between the estimated tool trajectory and the labeled tool trajectory becomes less than a predetermined threshold value.

The 3D model of the target object may be a point cloud model of the target object.

The labeled tool trajectory may be generated from the point cloud model of the target object by a three-dimensional (3D) motion planner that uses a rapidly exploring random tree (RRT) algorithm.

The 3D model of the target object may be a point cloud model of the target object. The labeled tool trajectory may be generated by a three-dimensional (3D) motion planner based on the point cloud model of the target object, a 3D model of the tool, a target position for the tool with respect to the target object, and a pose of the target object.

The estimated tool trajectory may be a tool trajectory from a position of a camera that captures the grayscale image and the depth image. The method may further include: receiving a camera-to-tool calibration value that indicates a relative position of the camera in relation to a position of the tool, and transforming the tool trajectory in a camera frame to a tool trajectory in a tool frame, based on the camera-to-tool calibration value.

According to an aspect of the disclosure, a service robot may include: a camera configured to capture an image of an RGB-depth image of a target object; an end-effector; a memory storing instructions; and a processor configured to execute the instructions to: receive a task to be performed by the service robot with respect to the target object; receive the RGB-depth image of the target object from the camera; and estimate a trajectory of the end-effector for reaching the target object to perform the task, from the RGB-depth image of the target object, via a pixels-to-plans neural network that is trained based on a labeled end-effector trajectory that is generated from a three dimensional (3D) model of the target object.

The pixels-to-plans neural network may include: a first dense convolutional network configured to receive and process a grayscale image of the RGB-depth image, and a second dense convolutional network configured to receive and process a depth image of the RGB-depth image, wherein the first dense convolutional network and the second dense convolutional network may process the grayscale image and the depth image in separate streams.

The pixels-to-plans neural network may further include: a concatenation layer that combines first features output from the first dense convolutional network and second features output from the second dense convolutional network; and a fully connected layer configured to process the combined first and second features to output the estimated tool trajectory.

The labeled tool trajectory may be generated by a three-dimensional (3D) motion planner, based on at least one of a point cloud model of the target object, a 3D model of the end-effector, and a target position for the end-effector with respect to the target object.

While the afore described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
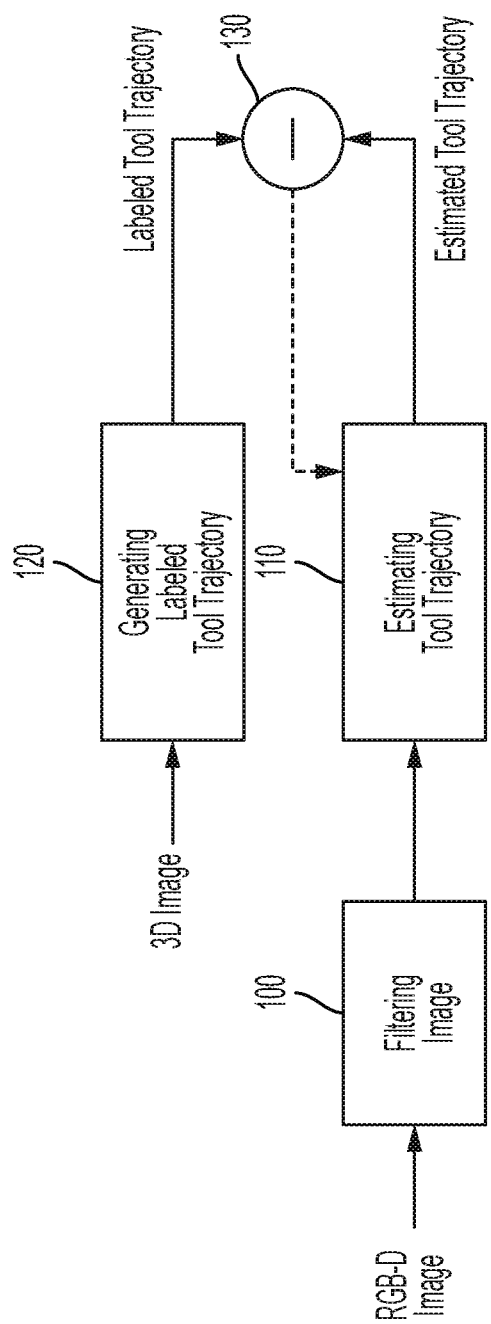
FIG. 1 is a diagram for describing a trajectory estimating process in accordance with embodiments of the present disclosure.

Embodiments of the present disclosure provide an artificial intelligence (AI)-based tool trajectory estimating apparatus and an operating method thereof.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

In the present specification, an 'image' may denote a still image, a plurality of consecutive still images, or a moving image.

Further, in the present specification, a neural network is a representative example of an artificial intelligence model, but embodiments are not limited to an artificial intelligence model using an algorithm.

Furthermore, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

FIG. 1 is a diagram for describing a trajectory estimating process in accordance with embodiments.

As shown in FIG. 1, an image filtering process 100 is performed on an RGB-depth (RGB-D) image including a grayscale image and a depth image of a target object. The grayscale image and the depth image may have the same view of the object.

In the image filtering process 100, a foreground mask may be applied to the grayscale image and the depth image to create a masked grayscale image and a masked depth image, in which pixel values are set to zero other than the area of the object.

A tool trajectory estimating process 110 is performed on the masked grayscale image and the masked depth image to estimate a tool trajectory for carrying out a task on the target object. For example, the tool may be a robot arm with an end-effector, the target object may be a shoe, and the task may be hooking up the shoe using the end-effector of the robot arm. In this case, the trajectory of the end-effector from the current location of the end-effector to a location inside the shoe, which allows the end-effector to hook up the shoe, is estimated from the masked grayscale image and the masked depth image of the shoe. The tool trajectory estimating process 110 may use a neural network to estimate the tool trajectory.

A labeled tool trajectory generating process 120 is performed to generate a labeled tool trajectory (i.e., a ground-truth tool trajectory) based on a three-dimensional (3D) image of the target object. For example, a rapidly exploring random tree (RTT) algorithm may be used to generate the labeled tool trajectory based on a 3D point cloud of the target object, a pose of the target object in a camera frame, a 3D model of the tool, and a goal position for the tool in the target object.

A comparison process 130 is performed to calculate a difference between the estimated tool trajectory and the labeled tool trajectory.

The difference between the estimated tool trajectory and the labeled tool trajectory may be used to update the tool trajectory estimating process 110. For example, neural network parameters (e.g. weights and biases) of the tool trajectory estimating process 110 may be adjusted until the difference between the estimated tool trajectory and the labeled tool trajectory drops below a predetermined threshold value. A neural network that performs tool trajectory estimating process 110 may be trained iteratively using optimization techniques like gradient descent. At each cycle of training, the difference between the estimated tool trajectory and the labeled tool trajectory is calculated as a loss, and is propagated back to the neural network using a technique called backpropagation. The neural network is trained in a manner in which each neuron's coefficients/weights are adjusted relative to how much the neurons contributed to the loss in the previous training cycle. The process is repeated iteratively until the loss becomes less than the predetermined threshold value.

Figure 2:
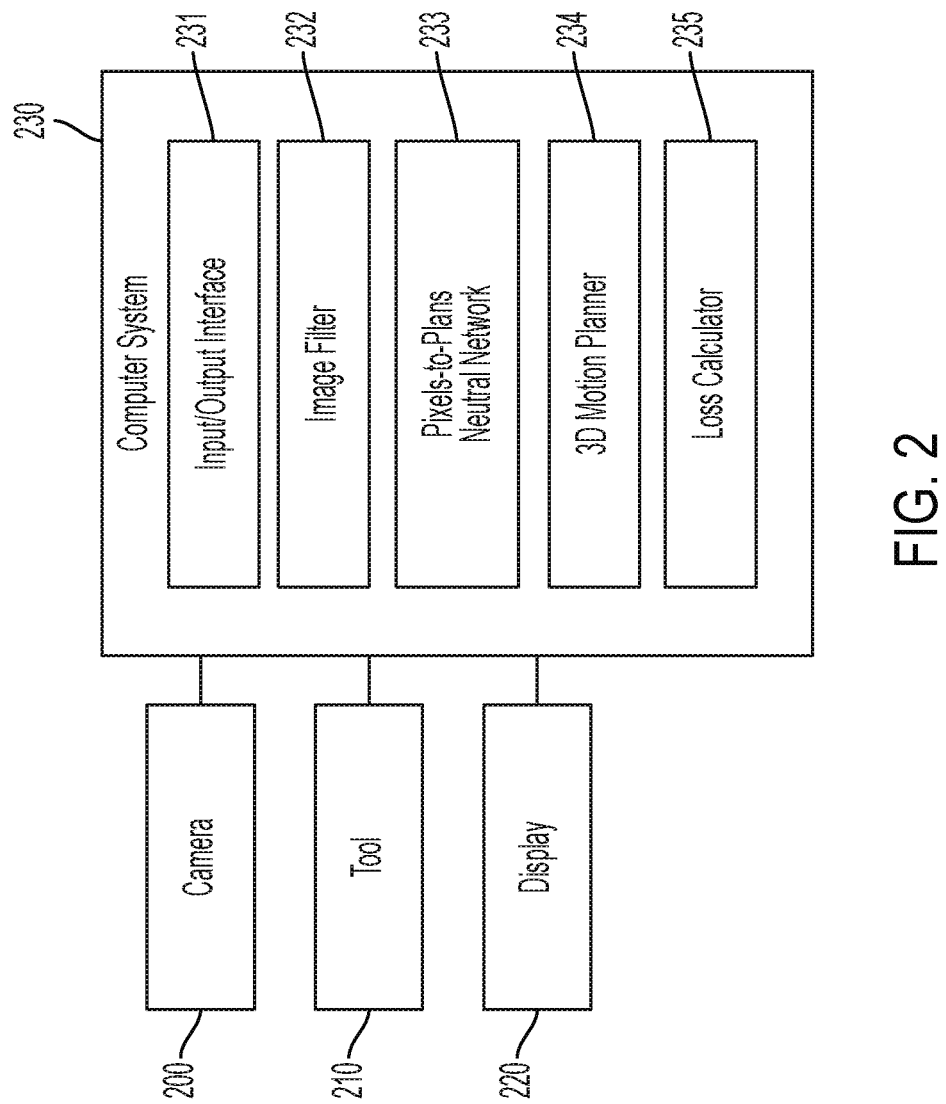
FIGS. 2 and 3 are block diagrams of a configuration of a trajectory estimating system in accordance with embodiments of the present disclosure.
Figure 3:
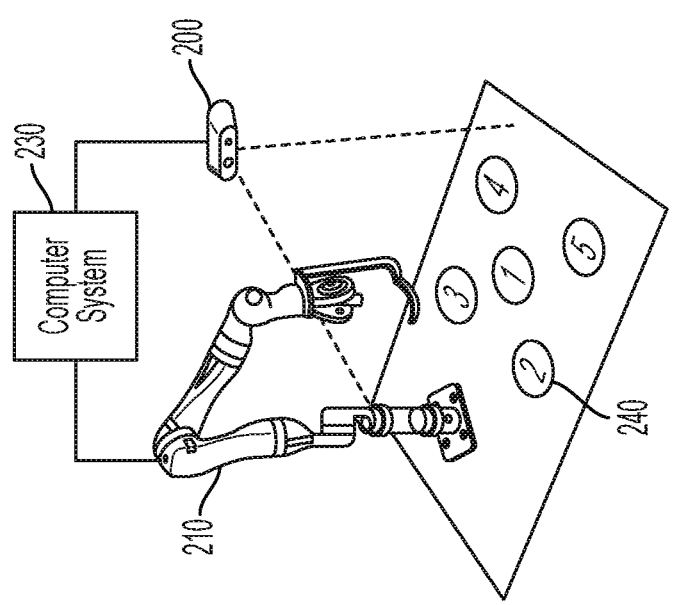

FIGS. 2 and 3 are block diagrams of a configuration of a trajectory estimating system in accordance with embodiments.

As shown in FIGS. 2 and 3, the trajectory estimating system in accordance with embodiments may include a camera 200, a tool 210, a display 220, and a computer system 230. The computer system 230 may include an input/output interface 231, an image filter 232, a pixels-to-plans (PTP) neural network 233, a 3D motion planner 234, and a loss calculator 235.

The trajectory estimating system may receive a task to be performed on a target object 240, and may estimate a movement path (i.e., trajectory) of the tool 210 to perform the task. For example, the trajectory estimating system may train the PTP neural network 233 that accepts as input an RGB-D image of the target object 240 and generates an estimated tool movement path (i.e., an estimated tool trajectory) of the tool 210 as output, which is then compared with an example tool movement path (i.e., a labeled tool trajectory) generated from the 3D motion planner 234. The estimated tool movement path may include a certain number of trajectory waypoints, each of which defines a pose of the tool 210 with respect to the camera 200 that has captured the RGB-D image. The PTP neural network 233 may be trained via imitation learning to minimize a loss function that is calculated by the loss calculator 235 to measure the similarity between the estimated tool movement path and the example tool movement path, so that the PTP neural network 233 closely replicates the example tool movement path.

Hereinafter, the elements of the trajectory estimating system are described in further detail.

The camera 200 may include one or more cameras and may be placed at different poses around the target object 240 to capture different views of the target object 240. The camera 200 may be implemented as one or more 3D cameras and/or RGB-D cameras.

The tool 210 is operated under the control of the computer system 230 to manipulate the target object 240. The target object 240 may be placed in a random orientation and position (e.g., at one of positions 1-5) on the table shown in FIG. 3. The tool 210 may be a robot arm with an end effector. Examples of the end effector may include grippers, scoops, tweezers, force-torque sensors, material removal tools, welding torches, collision sensors, and tool changers, and the types of the end effector are not limited thereto. Examples of the target object 240 to be manipulated by the tool 210 may include a hook, a cup, a container, a bag, and the like. For example, when a hook of a robot arm is used as the tool 210 and the target object 240 is a shoe, the computer system 230 may estimate trajectories of the hook for picking up the shoe.

The display 220 may display images captured by the camera 200 and estimated trajectories of the tool 210. For example, the display 220 may display the estimated trajectories of the hook for picking up the shoe.

The input/output interface 231 may enable communications between the camera 200, the tool 210, and the display 220, and the computer system 230. The input/output interface 231 may include a transceiver and/or a separate receiver and transmitter that enables the computer system 230 to communicate with other devices, such as via a wired connection, a wireless connection, or a combination of wired and wireless connections. The input/output interface 231 may permit the computer system 230 to receive information from another device and/or provide information to another device. For example, the input/output interface 231 may include an Ethernet interface, an optical interface, a coaxial interface, an infrared interface, a radio frequency (RF) interface, a universal serial bus (USB) interface, a Wi-Fi interface, a cellular network interface, or the like.

The image filter 232, the PTP neural network 233, the 3D motion planner 234, and the loss calculator 235 may be implemented by at least one processor and at least one memory.

The processor is implemented in hardware, firmware, or a combination of hardware and software. The processor may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor includes one or more processors capable of being programmed to perform a function. The processor may access the memory and execute computer readable program instructions that are stored in the memory.

The memory stores information, data, an operating system, a plurality of program modules software related to the operation and use of the trajectory estimating system. For example, the memory may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. The memory may include program instructions and codes configured to be executed by the processor to perform the operations of the image filter 232, the PTP neural network 233, the 3D motion planner 234, and the loss calculator 235.

The image filter 232 may perform the image filtering process 100 on an RGB-D image of the target object 240. Specifically, the image filter 232 receives the RGB-D image from the camera 200 via the input/output interface 231. The RGB-D image may be formed of a Red Blue Green (RGB) image and its corresponding depth image in which each pixel relates to a distance between the image plane and the target object 240 in the RGB image. The RGB-D image may include a pair of a grayscale image and a depth image.

The image filter 232 may generate a foreground mask of the grayscale image and the depth image. In particular, the image filter 232 may identify the location of the target object 240 in the grayscale image and the depth image, and may set pixel values and depth values of the grayscale image and the depth image to zero, except the area of the target object 240 in the grayscale image and the depth image. For example, the image filter 232 may estimate a plane and filtering depth points of the grayscale and the depth images, and/or may segment the target object 240 from the rest of the image using a separate convolutional neural network, to acquire the foreground mask. The image filter 232 may apply the foreground mask to the grayscale image and the depth image, to output a masked grayscale image and a masked depth image.

The PTP neural network 233 may perform the tool trajectory estimating process 110 on the masked grayscale image and the masked depth image.

The PTP neural network 233 receives the masked grayscale image and the masked depth image from the image filter 232, and may estimate a tool trajectory in a camera frame (hereinafter, also referred to as "camera-frame tool trajectory"). For example, The PTP neural network 233 may be trained using a single RGB-D image, for each training iteration, and may also use a single RBG-D image to estimate the camera-frame tool trajectory after the training is completed.

The structures of the PTP neural network 233 are described with reference to FIGS. 4 and 5.

Figure 4:
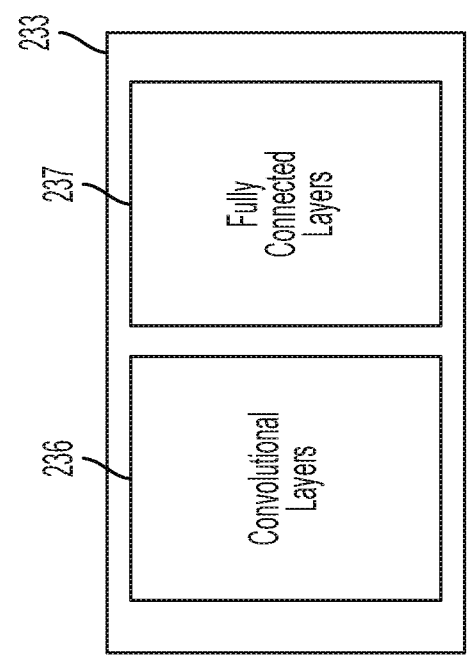

As shown in FIG. 4, the PTP neural network 233 may include convolutional layers 236 and fully connected layers 237. In another embodiment, there may be a single convolutional layer instead of convolutional layers 236 and there may be a single fully connected layer instead of fully connected layers 237. The convolutional layers 236 perform a convolution operation on input data, which are the masked grayscale image and the masked depth image.

The convolution operation may include to a linear operation that involves multiplication of a set of weights with the input data, and a sum of the products of the multiplications. For example, the multiplication may be performed between an array of the input data and an array of the weight. Here, the array of the weight may be referred to as a filter or a kernel, and may be stored in the memory of the computer system 230.

The fully connected layers 237 may include a plurality of layers, in which each neuron in one layer is connected to all neurons in the next layer. In the forward pass, the convolutional layers 236 and the fully connected layers 237 may process the masked grayscale image and the masked depth image and output the estimated camera-frame tool trajectory.

Figure 5:
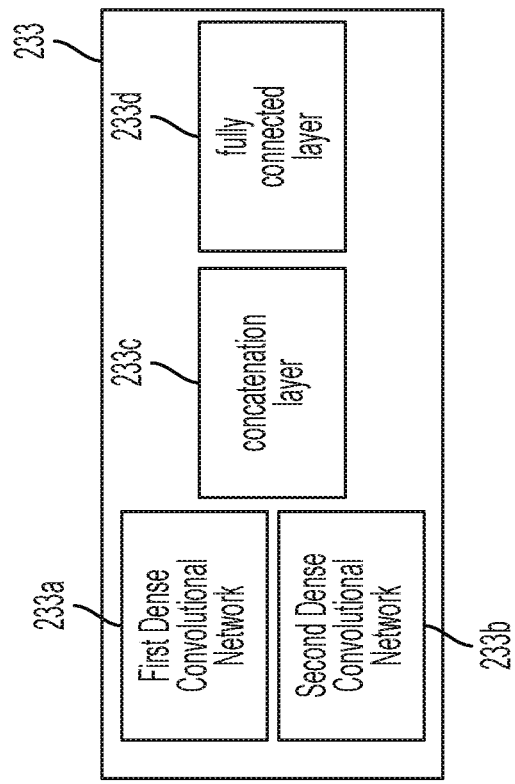
FIGS. 4 and 5 illustrate structures of a pixels-to-plans neural network in accordance with embodiments of the present disclosure.

In another example embodiment, the PTP neural network 233 may include two separate convolutional networks 233a and 233b to process the masked grayscale image and the masked depth image separately and in parallel, as shown in FIG. 5. The PTP neural network 233 may include a first dense convolutional network 233a, a second dense convolutional network 233b, a concatenation layer 233c, and at least one fully connected layer 233d.

With reference to FIG. 5, in the first dense convolutional network 233a and the second dense convolutional network 233b, each layer may obtain inputs (e.g., feature maps) from all preceding layers and pass on its own feature-maps to all subsequent layers. The first dense convolutional network 233a and the second dense convolutional network 233b may use fewer parameters and provide a higher accuracy than a conventional convolutional network, because each layer receives feature maps from all preceding layers and therefore the connection between the layers is dense.

In the forward pass, the masked grayscale image and the masked depth image may be separately fed into the first dense convolutional network 233a and the second dense convolutional network 233b. The first dense convolutional network 233a and the second dense convolutional network 233b may process the masked grayscale image and the masked depth image in separate streams, to extract a first set of features and a second set of features as a first intermediary output and a second intermediary output, respectively. In embodiments of the disclosure, weights of the first dense convolutional network 203 and the second dense convolutional network 204 may not be shared across these streams.

The concatenation layer 233c may combine the first intermediary output and the second intermediary output together. For example, when each of the first dense convolutional network 233a and the second dense convolutional network 233b extracts 1000 features, the concatenation layer 233c may concatenate the two sets of 1000 features to output a total of 2000 features.

The fully connected layer 233d may include an input layer, two or more hidden layers coupled with a rectified linear unit (ReLU) activation function, and an output layer. The two or more hidden layers may compute mixed features, and the output layer may regress the camera-frame tool trajectory as a single output vector $\hat{t}$. For example, the estimated tool trajectory cT in the camera frame, and the single vector E are expressed as follows:

$$c\hat{W} = \{\hat{w}_i : i \in 1, \ldots, N\},$$
$$\hat{t} \in R^{(12N)},$$

wherein N denotes the number of trajectory waypoints.

The PTP neural network 233 may recognize the output vector $\hat{t}$ as a sequence of sub-vector $\hat{t}_i \in R^{12}$, each corresponding to a homogeneous transform from a coordinate frame of the camera 200 to a coordinate frame of the tool 210 (e.g., a coordinate frame of a robot's end effector) at waypoint i. A waypoint sub-vector $\hat{t}_i$ may be expressed as follows:

$$\hat{t}_i = \{t_i^1, t_i^2, t_i^3, t_i^4, t_i^5, t_i^6, t_i^7, t_i^8, t_i^9, t_i^{10}, t_i^{11}, t_i^{12}\}$$

For each waypoint vector $t_i$, the first three values $t_i^1$, $t_i^2$, and $t_i^3$ may represent x, y, and z positions of the tool 210 in the camera's coordinate frame. The last nine values $t_i^4$, $t_i^5$, $t_i^6$, $t_i^7$, $t_i^8$, $t_i^9$, $t_i^{10}$, and $t_i^{12}$ may represent a serialized 3D rotation matrix indicating the orientation of the tool 210 relative to the camera 200 at waypoint i.

The PTP neural network 233 may learn trajectories of the tool 210 in the camera frame, and the learned trajectories may be decoupled from the position of the tool 210 based on a camera-to-tool calibration value, so the trained PTP neural network 233 can be used with arbitrary robot positions and camera positions without retraining the PTP neural network 233.

Referring back to FIG. 2, the 3D motion planner 234 may perform the labeled tool trajectory generating process 120 on a 3D image of the target object 240. The 3D image may be captured by the same camera 200 that provides the RGB-D image. In another example, the camera 200 includes a plurality of camera modules, and different camera modules are used to capture the 3D image and the RGB-D image.

The 3D motion planner 234 may generate a labeled tool trajectory based on a 3D model of the tool 210, a 3D point cloud of the target object 240, a goal/target position for the tool 210 with respect to the target object 240, and a pose of the target object 240 in a camera frame. The 3D motion planner 234 may use a rapidly exploring random tree (RRT) algorithm to create the labeled tool trajectory from the 3D image of the target object 240. The labeled tool trajectory may be used to calculate a loss in comparison with the estimated tool trajectory and thereby to train the PTP neural network 233 to minimize the loss.

The 3D motion planner 234 may acquire, from the camera 200, the 3D point cloud of the target object and the pose of the target object in the camera frame, as described hereinafter with reference to FIG. 6.

Figure 6:
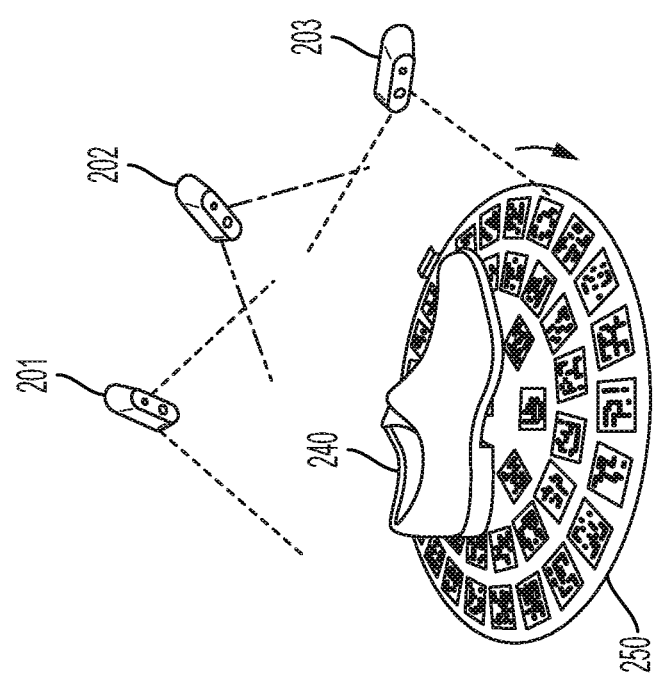
FIG. 6 illustrates a system for obtaining dataset for a three-dimensional (3D) motion planner, in accordance with embodiments of the present disclosure.

FIG. 6 illustrates a system for obtaining a training dataset for the 3D motion planner 234.

As shown in FIG. 6, the camera 200 may include first, second, and third cameras 201-203 placed at different poses around a turntable 250. The target object 240 may be placed on the turntable 250, and the first, second, and third cameras 201-203 may capture images of the target object 240 at a pre-set interval (e.g., 5° interval) when the turntable 250 stops at the pre-set interval while rotating a full 360°.

Once the images are collected, the camera pose of each frame is computed using a visual fiducial software module such as AprilTag. A depth point cloud of the target object 240 is obtained by removing all other points except the target object area and by filtering the images using a voxel-based simplification method.

The depth point cloud may be projected onto each RGB image to generate a mask and compute the pose of the target object 240 with respect to the corresponding camera frame. Multiple RGB-D views of the target object 240 may be synthesized into a single object model so that the 3D point cloud of the target object 240 is to be extracted from the single object model.

Returning back to FIG. 2, the loss calculator 235 may perform the comparison process 130 to determine a similarity between the estimated tool trajectory and the labeled tool trajectory that is generated by the 3D motion planner 234. The loss calculator 235 may calculate a difference between the estimated tool trajectory and the labeled tool trajectory as a loss of the PTP neural network 233, and propagate the loss back to the PTP neural network 233 to train the PTP neural network 233 until the loss drops below a threshold value using a technique called backpropagation.

For example, the loss for the estimated tool trajectory is expressed as a weighted sum of individual trajectory waypoint losses as follows:

$$L_{traj}(\hat{\omega}, \omega^*) = \Sigma_{i=1}^n \alpha_i l(\hat{\omega}_i, \omega^*_i) \qquad \text{Equation (1)}$$

wherein, $\hat{\omega}$ is an estimated tool trajectory, w* denotes a labeled tool trajectory, $l(\hat{\omega}_i, \omega^*_i)$ denotes individual trajectory waypoint losses, and $\alpha_i$ denotes a weight factor.

The individual trajectory waypoint losses $l(\hat{\omega}_i, \omega^*_i)$ may be computed by decomposing each waypoint into its representative translation and rotation sub-components. For twelve dimensional waypoint vectors ω, functions Trans(ω): $R^{12} \rightarrow R^3$ and Rot(ω): $R^{12} \rightarrow R^{3 \times 3}$ are used, wherein the functions extract a position matrix and a rotation matrix of a given waypoint relative to the camera coordinate frame, respectively. For example, the individual trajectory waypoint losses $l(\hat{\omega}_i, \omega^*_i)$ may be calculated as follows:

$$l(\hat{\omega}_i, \omega^*_i) = \lambda l_T(\hat{\omega}_i, \omega^*_i) + \gamma l_R(\hat{\omega}_i, \omega^*_i) \quad \text{Equation (2)}$$

wherein, $l_T(\hat{\omega}_i, \omega^*_i)$ is a squared Euclidean distance loss expressed as follows:

$$l_T(\hat{\omega}_i, \omega^*_i) = \|\text{Trans}(\hat{\omega}_i) - \text{Trans}(\omega^*_i)\|^2 \quad \text{Equation (3)}$$

wherein, $l_R(\hat{\omega}_i, \omega^*_i)$ is a squared deviation of a product of a predicted rotation matrix Rot($\hat{\omega}_i$) and a transpose of a ground truth rotation matrix Rot($\omega^*_i$), and is expressed as follows:

$$l_R(\hat{\omega}_i, \omega^*_i) = \|Rot(\hat{\omega}_i)Rot(\omega^*_i)^T - 1\|^2 \quad \text{Equation (4)}$$

wherein λ and γ are weight factors.

For example, λ and γ may be set to be equal, for example, as a value 1, and $\alpha_i$ may be set to 1 for all i, so as to weight the rotation matrix deviation loss and waypoint coordinate loss equally and weight all individual waypoint losses equally within a trajectory.

Figure 7:
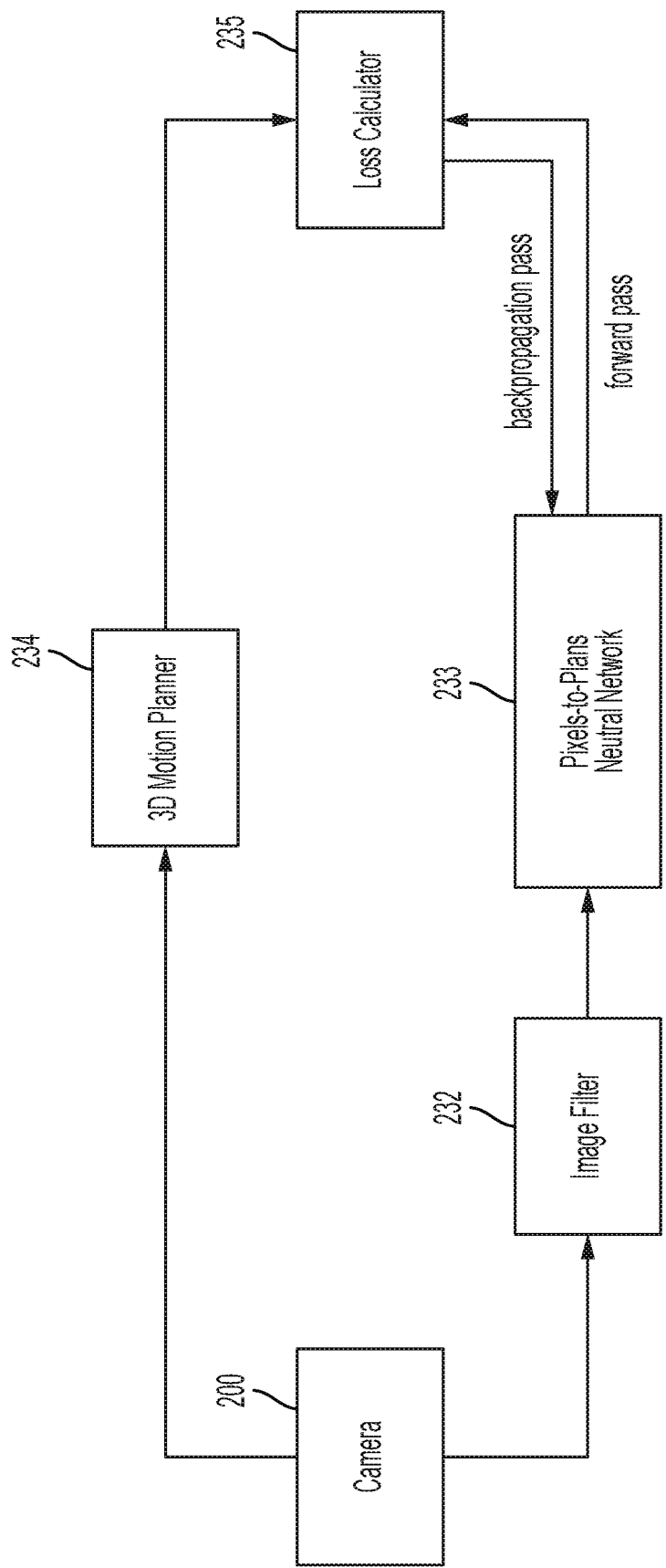
FIG. 7 is a diagram for describing a method of training a pixels-to-plans neural network according to embodiments of the present disclosure.

FIG. 7 is a diagram for describing a method of training a pixels-to-plans neural network according to embodiments.

With reference to FIG. 7, a camera 200 may capture 3D images and an RGB-D image of a target object 240. The camera 200 may include a plurality of camera devices, and the same camera or different cameras may be used to capture the three-dimensional images and the RGB-D image.

The camera 200 may transmit the RGB-D image of the target object 240 to a PTP neural network 233 through an image filter 232, so that the RGB-D image is used to generate an estimated tool trajectory. The camera 200 may transmit the three-dimensional images to a 3D motion planner 234 so that the 3D images are used to generate a labeled tool trajectory.

The image filter 232 may receive the RGB-D image including a grayscale image and a depth image of the target object 240. The image filter 232 may apply a foreground mask to the grayscale image and the depth image, to set pixel values and depth values of the grayscale image and the depth image to zero, except the area of the target object 240 in the grayscale image and the depth image. The image filter 232 may transmit the masked grayscale image and the masked depth image to the PTP neural network 233.

The PTP neural network 233 may infer or estimate a trajectory of a tool 210 for performing an assigned task on the target object 240, in the forward pass. Specifically, the PTP neural network 233 receives the masked grayscale image and the masked depth image from the image filter 232, and outputs an estimated tool trajectory in the camera frame. The PTP neural network 233 transmits the estimated tool trajectory to the loss calculator 235.

The 3D motion planner 234 may receive the 3D images of the target object 240 from the camera 200. The 3D motion planner 234 may perform image processing on the 3D images to obtain a 3D point cloud of the target object 240 and a pose of the target object 240 in the camera frame. In another example, the image processing may be performed by a hardware module or a software module that is separately provided from the 3D motion planner 234.

The 3D motion planner 234 may also receive a 3D model of the tool 210, a 3D point cloud of the target object 240, and a goal/target position for the tool 210 with respect to the target object 240, from an external device or a local storage.

The 3D motion planner 234 may generate a labeled tool trajectory based on the 3D model of the tool 210, the 3D point cloud of the target object 240, the goal/target position for the tool 210 with respect to the target object 240, and the pose of the target object 240 in the camera frame. The 3D motion planner 234 may transmit the labeled tool trajectory to the loss calculator 235.

The loss calculator 235 may calculate a difference based on the estimated tool trajectory and the labeled tool trajectory, as a loss of the PTP neural network 233. The loss is propagated back to the PTP neural network 233 in the backpropagation pass to train the PTP neural network 233 and minimize the loss until the loss drops below a predetermined threshold value.

Figure 8:
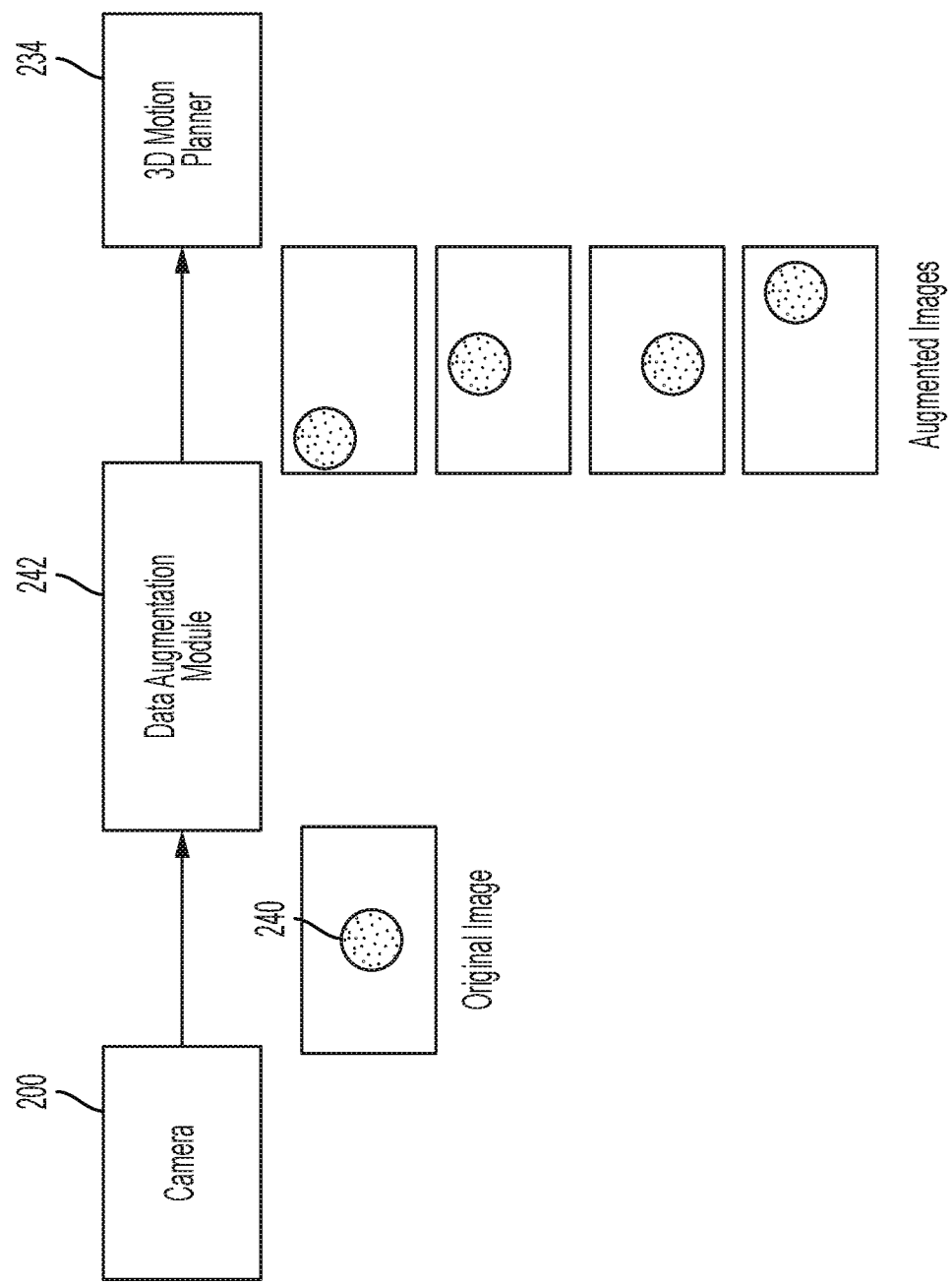
FIG. 8 illustrates a configuration of a trajectory estimating system including a data augmentation module, in accordance with embodiments of the present disclosure.

FIG. 8 illustrates a configuration of a trajectory estimating system including a data augmentation module, in accordance with embodiments.

As shown in FIG. 8, a data augmentation module 242 may be provided between the camera 200 and the 3D motion planner 234 to augment a raw dataset captured by the camera 200.

For example, the raw dataset contains an original image captured by the camera 200, in which the target object 240 is positioned at the center. The data augmentation module 242 may apply augmentation to the raw dataset by simulating a random rotation about the x and y axes of the camera frame, forming a rotation matrix $R_{\theta\phi} = R_y(\phi)R_x(\theta)$, and making a random displacement in the direction of the camera frame z axis, ΔZ. In the augmented images, the target object 240 is placed off the center and rotated about the axes of the camera frame.

Figure 9:
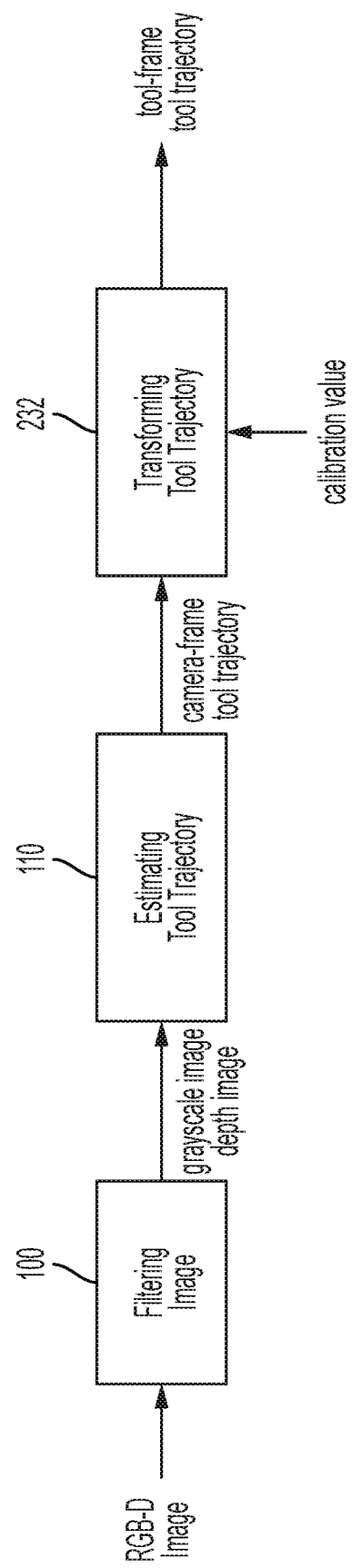
FIG. 9 illustrates a diagram for describing a trajectory estimating process in accordance with embodiments of the present disclosure.

FIG. 9 illustrates a diagram for describing a trajectory estimating process in accordance with embodiments.

With reference to 9, an image filtering process 100 is performed an RGB-D image including a grayscale image and a depth image. In the image filtering process 100, a foreground mask may be applied to the grayscale image and the depth image to create a masked gray image and a masked depth image, in which pixel values are set to zero other than the area of the object.

A tool trajectory estimating process 110 is performed on the masked grayscale image and the masked depth image, based on a PTP neural network 233 that is trained using a labeled/ground-truth tool trajectory of a 3D motion planner 234, to generate a camera-frame tool trajectory.

A tool trajectory transforming process 232 is performed on the camera-frame tool trajectory in a camera frame (i.e., from a position of the camera 200) to transform the camera-frame tool trajectory to a tool-frame tool trajectory, based on a camera-to-tool calibration value.

The tool-frame tool trajectory may indicate a trajectory of the tool 210 in a tool frame (i.e., from a position of the tool 210). For example, when the tool 210 is an end-effector of a robot arm, the tool-frame tool trajectory may indicate a trajectory of the end-effector from a position of the robot.

The camera-to-tool calibration value may indicate a relative position between the camera 200 and the tool 210 during a training process. The camera-to-tool calibration value may be determined during the training process, and may be stored in a system performing the post-training processes 100, 110, and 232, as a predetermined value.

Figure 10:
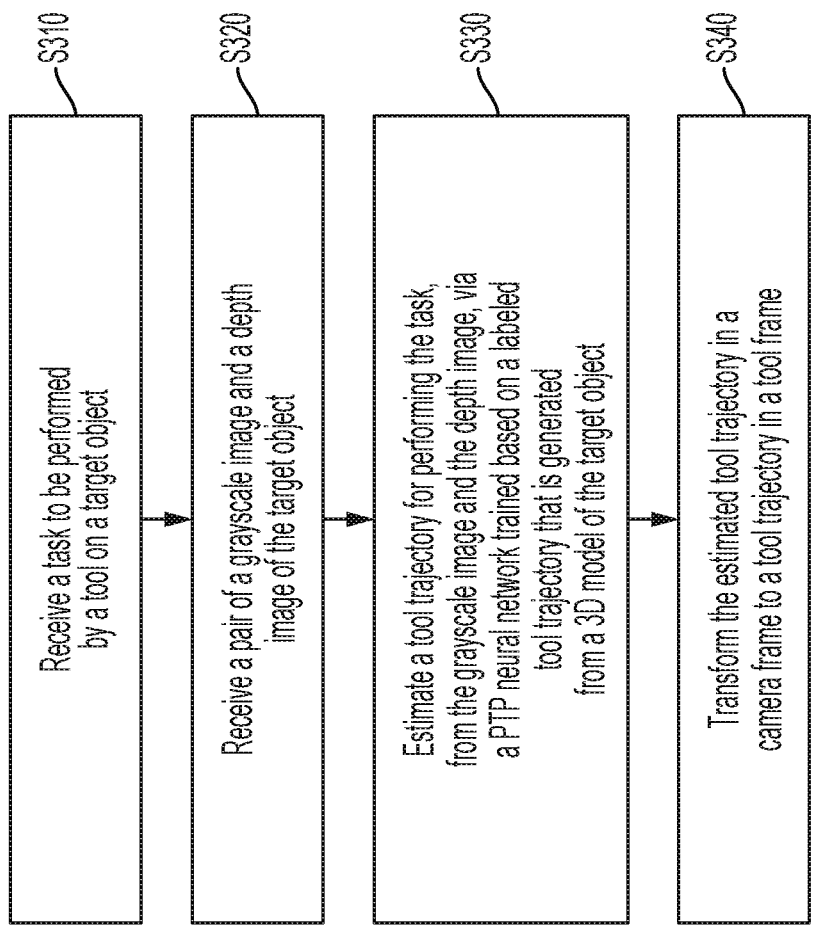
FIG. 10 is a flowchart for describing a trajectory estimating method in accordance with embodiments of the present disclosure.

FIG. 10 is a flowchart for describing a trajectory estimating method in accordance with embodiments.

As shown in FIG. 10, a trajectory estimating system may receive a task to be performed by a tool (e.g. a robot arm having an end-effector) 210 on a target object (e.g., a shoe) 240, in operation S310.

In operation S320, the trajectory estimating system may receive a pair of a grayscale image and a depth image that has the same view of the target object 240.

In operation S330, the trajectory estimating system may estimate a tool trajectory for performing the task (e.g., hooking up a shoe using a robot arm end-effector) via a PTP neural network 233 that is trained based on a labeled tool trajectory that is generated from a 3D model of the target object 240.

The labeled tool trajectory may be generated by a 3D motion planner 234 that uses a rapidly exploring random tree (RRT) algorithm. For example, the 3D motion planner 234 may generate the labeled tool trajectory based on a point cloud model of the target object 240, a 3D model of the tool 210, a target position for the tool 210 with respect to the target object 240, and a pose of the target object 240, by using the RRT algorithm.

The PTP neural network 233 may include a first dense convolutional network 233a configured to receive and process the grayscale image, a second dense convolutional network 233b configured to receive and process the depth image, wherein the first dense convolutional network 233a and the second dense convolutional network 233b process the grayscale image and the depth image in separate streams.

The PTP neural network 233 may further include a concatenation layer 233c that combines first features output from the first dense convolutional network 233a and second features output from the second dense convolutional network 233b, and a fully connected layer 233d configured to process the combined first and second features to output the estimated tool trajectory.

The PTP neural network 233 may be trained to minimize a difference between the estimated tool trajectory and the labeled tool trajectory. For example, the PTP neural network 233 may be trained until the difference between the estimated tool trajectory and the labeled tool trajectory drops below a predetermined threshold value.

In operation S340, the trajectory estimating system may transform the estimated tool trajectory in a camera frame to a tool trajectory in a tool frame, based on a camera-to-tool calibration value that indicates a relative position of the camera 200 in relation to a position of the tool 210 at the time of training the PTP neural network 233.

Figure 11:
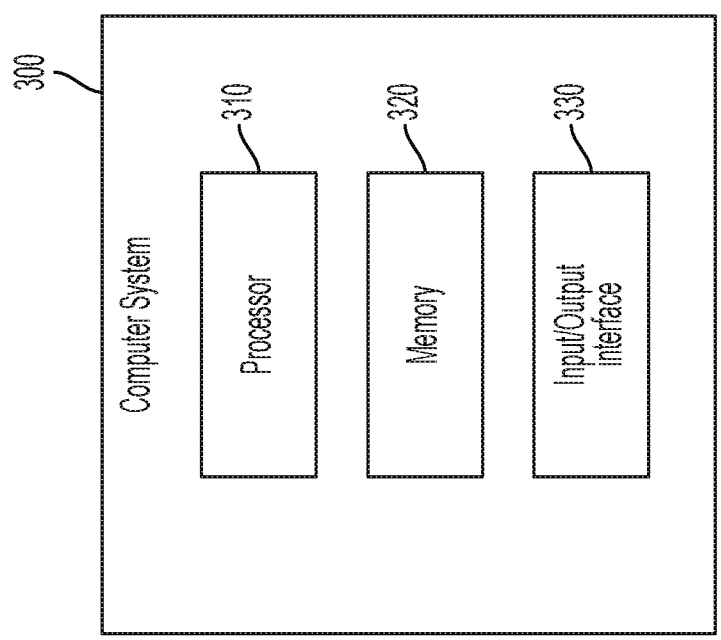
FIG. 11 is a block diagram of a configuration of a trajectory estimating system in accordance with embodiments of the present disclosure.

FIG. 11 is a block diagram of a configuration of a trajectory estimating system in accordance with embodiments.

As shown in FIG. 11, the trajectory estimating system may include computer system 300 including a processor 310, a memory 320, and an input/output interface 330.

The processor 310 may perform overall control of the trajectory estimating system, and may execute one or more programs stored in the memory 320. The processor 310 is implemented in hardware, firmware, or a combination of hardware and software. The processor 310 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 310 includes one or more processors capable of being programmed to perform a function.

The processor 310 according to embodiments of the disclosure may perform any one or any combination of operations of the image filter 232, the PTP neural network 233, the 3D motion planner 234, and the loss calculator 235 which are described with reference to FIGS. 2-3 and 7, operations of the data augmentation module 242 described with reference to FIG. 8, the image filtering process 100, the tool trajectory estimating process 110, the tool trajectory transforming process 232 described with reference to FIG. 9, and operations S310-S340 described with reference to FIG. 10.

The memory 320 may also include a random access memory (RAM), a read only memory (ROM), and/or another type of dynamic or static storage device (e.g., a flash memory, a magnetic memory, and/or an optical memory). The memory 320 may also include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The storage 320 may store various data, programs, or applications for driving and controlling the trajectory estimating system. A program stored in the memory 320 may include one or more instructions. A program including one or more instructions or an application stored in the memory 320 may be executed by the processor 310.

The input/output interface 330 may enable the computer system 300 to communicate with other devices, such as a camera 200, a tool 210, and a display 220, via a wired connection, a wireless connection, or a combination of wired and wireless connections.

In embodiments of the present disclosure, the trajectory estimating system may closely replicate an example tool movement path to perform an assigned task on an object, using a single view RGB-D image of the object, and therefore computational complexity is reduced and accuracy of a tool trajectory estimation is enhanced.

Figure 12:
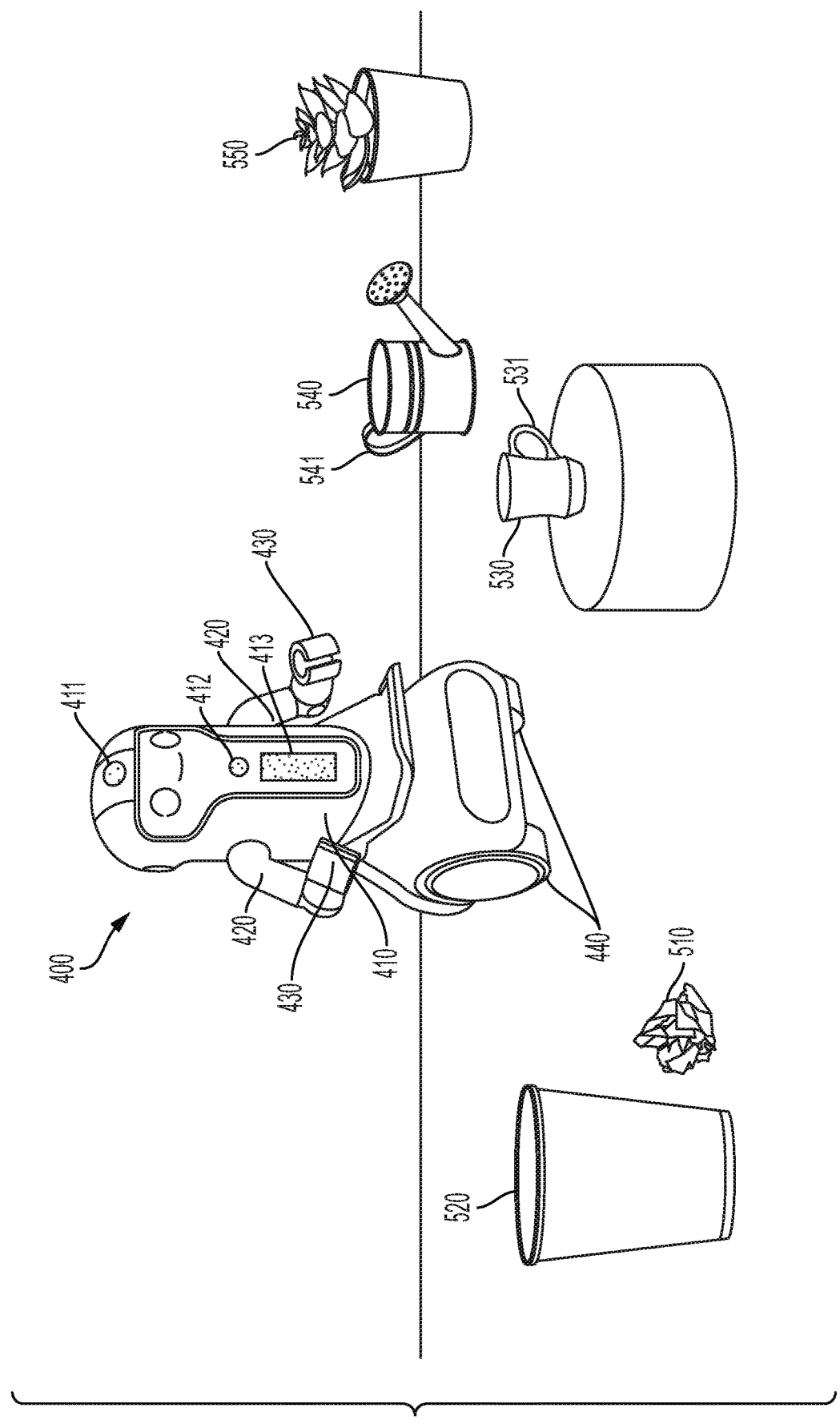
FIG. 12 illustrates a service robot performing assigned tasks in a first work environment according to embodiments of the present disclosure.

FIG. 12 illustrates a service robot performing assigned tasks in a first work environment (e.g., a home) according to embodiments of the present disclosure. The service robot may be a robot butler that is trained to perform household tasks, chores, healthcare duties, or any other activities performed at home.

For example, as shown in FIG. 12, a service robot 400 may include a body 410, arms 420, hands 430, and wheels 440. The body 410 may include a camera 411, a microphone 412, and a touchpad 413

The service robot 400 may move around a designated area (e.g., a house, or a bedroom of the house) using the wheels 440, and may monitor the designated area through the camera 411 to perform various tasks assigned by a user.

To carry out the assigned tasks, the service robot 400 may include the computer system 230 as shown in FIG. 2 or the computer system 300 as shown in FIG. 11. The arms 420 and the hands 430 of the service robot 400 may operate as the tool 210 illustrated in FIGS. 2 and 3, and the hands 430 may be also referred to as end-effectors. The camera 411 may be implemented by the camera 200 in FIGS. 2 and 3 and/or the first to third cameras 201-203 in FIG. 6.

With reference to FIGS. 11 and 12, the service robot 400 may receive tasks through the input/output interface 330, such as the microphone 412, the touchpad 413, and/or a built-in wireless communication module. The service robot 400 may pre-store commands for performing tasks in the memory 320. Examples of the tasks may include various household chores, such as cleaning, organizing, and gardening.

For example, the camera 411 of the service robot 400 captures an RGB-D image of a cup 530, which includes a pair of a grayscale image and a depth image of the cup 530. The processor 310 may apply a foreground mask to the grayscale image and the depth image of the cup 530, and may calculate a trajectory of the hand 430 of the service robot 400 to reach a handle 531 of the cup 530 by inputting the grayscale image and the depth image of the cup 530 to the PTP neural network 233.

Here, the PTP neural network 233 is trained based on a labeled trajectory (i.e., a ground truth trajectory) of the hand 430 of the service robot 400 that is generated based on 3D models (e.g., a point cloud model) of various cups, a 3D model of the hand 430, and a target position of the hand 430 with respect to a cup. For example, the labeled trajectory of the hand 430 may be generated by a 3D motion planner, and the 3D motion planner may accept the 3D models of the cups, the 3D model of the hand 430, and the target position of the hand 430 as input and applies an RRT algorithm to the input to generate the labeled trajectory of the hand 430.

Once the processor 310 calculates the trajectory of the hand 430, the service robot 400 may perform a task of picking up the cup 530 by manipulating the arm 420 and the hand 430 according to on the calculated trajectory.

In another example, the service robot 400 may capture an RGB-D image of a trash 510 and may input the RGB-D image of the trash 510 to the PTP neural network 233 to calculate a trajectory of the hand 430 to reach the trash 510. The PTP neural network 233 may be trained based on a labeled trajectory of the hand 430 that is generated by a 3D motion planner using a 3D model of a trash as input. The service robot 400 may perform a task of picking up the trash 510 off the floor and putting the trash 510 into a trash can 520, based on the calculated trajectory.

In another example, the service robot 400 may capture an RGB-D image of a watering can 540, and may calculate a trajectory of the hand 430 to reach a handle of the watering can 540 by inputting the RGB-D image of the watering can 540 to the PTP neural network 233. The PTP neural network 233 may be trained based on a labeled trajectory of the hand 430 that is generated by a 3D motion planner using a 3D model of a watering can as input. The service robot 400 may perform a task of picking up the watering can 540 and watering the plant 500, based on the calculated trajectory.

Figure 13:
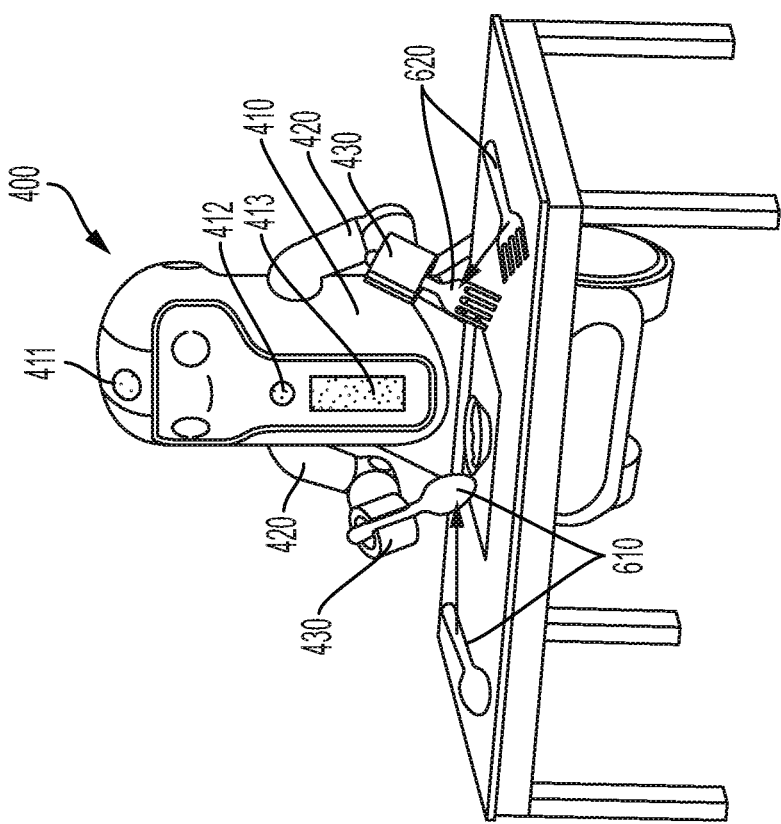
FIG. 13 illustrates a service robot performing assigned tasks in a second work environment according to embodiments of the present disclosure.

FIG. 13 illustrates a service robot performing assigned tasks in a second work environment (e.g., a restaurant kitchen, a home kitchen, or other environments such as residential, commercial, industrial, and research environments) according to embodiments of the present disclosure.

The service robot 400 illustrated in FIG. 13 may have substantially the same structure as the service robot 400 illustrated in FIG. 12.

With reference to FIGS. 11-13, the service robot 400 may receive tasks through the input/output interface 330, such as the microphone 412, the touchpad 413, and/or a built-in wireless communication module. The service robot 400 may pre-store commands for performing tasks in the memory 320. Examples of the tasks may include cooking, washing dishes, and cleaning kitchen surfaces.

For example, the camera 411 of the service robot 400 captures an RGB-D image of a first kitchen utensil (e.g., a spoon) 610 that is placed on a kitchen surface. The RGB-D image of the first kitchen utensil 610 may consist of a pair of a grayscale image and a depth image of the first kitchen utensil 610. The processor 310 may apply a foreground mask to the grayscale image and the depth image of the first kitchen utensil 610, and may calculate a trajectory of the right hand 430 of the service robot 400 to reach and pick up the first kitchen utensil 610, by inputting the grayscale image and the depth image of the first kitchen utensil 610 to the PTP neural network 233. The PTP neural network 233 may be trained based on a labeled trajectory of the right hand 430 that is generated by a 3D motion planner using 3D models of the first kitchen utensil 610 (e.g., 3D models of various spoons), a 3D model of the hand 430, and a target position of the hand 430 with respect to the first kitchen utensil 610 or other various first kitchen utensils. The service robot 400 may perform a task of picking up the first kitchen utensil 610 based on the calculated trajectory of the right hand 430, to cook food using the first kitchen utensil 610.

The camera 411 of the service robot 400 captures an RGB-D image of a second kitchen utensil (e.g., a fork) 620 that is placed on a kitchen surface. The RGB-D image of the second kitchen utensil 620 includes a pair of a grayscale image and a depth image of the second kitchen utensil 620. The processor 310 may apply a foreground mask to the grayscale image and the depth image of the second kitchen utensil 620, and may calculate a trajectory of the left hand 430 of the service robot 400 to reach and pick up the second kitchen utensil 610, by inputting the grayscale image and the depth image of the second kitchen utensil 620 to the PTP neural network 233. The PTP neural network 233 may be trained based on a labeled trajectory of the left hand 430 that is generated by a 3D motion planner using a 3D model of the second kitchen utensil 620. The service robot 400 may perform a task of picking up the second kitchen utensil 620 based on the calculated trajectory of the left hand 430 to start cooking food using the second kitchen utensil 620.

Figure 14:
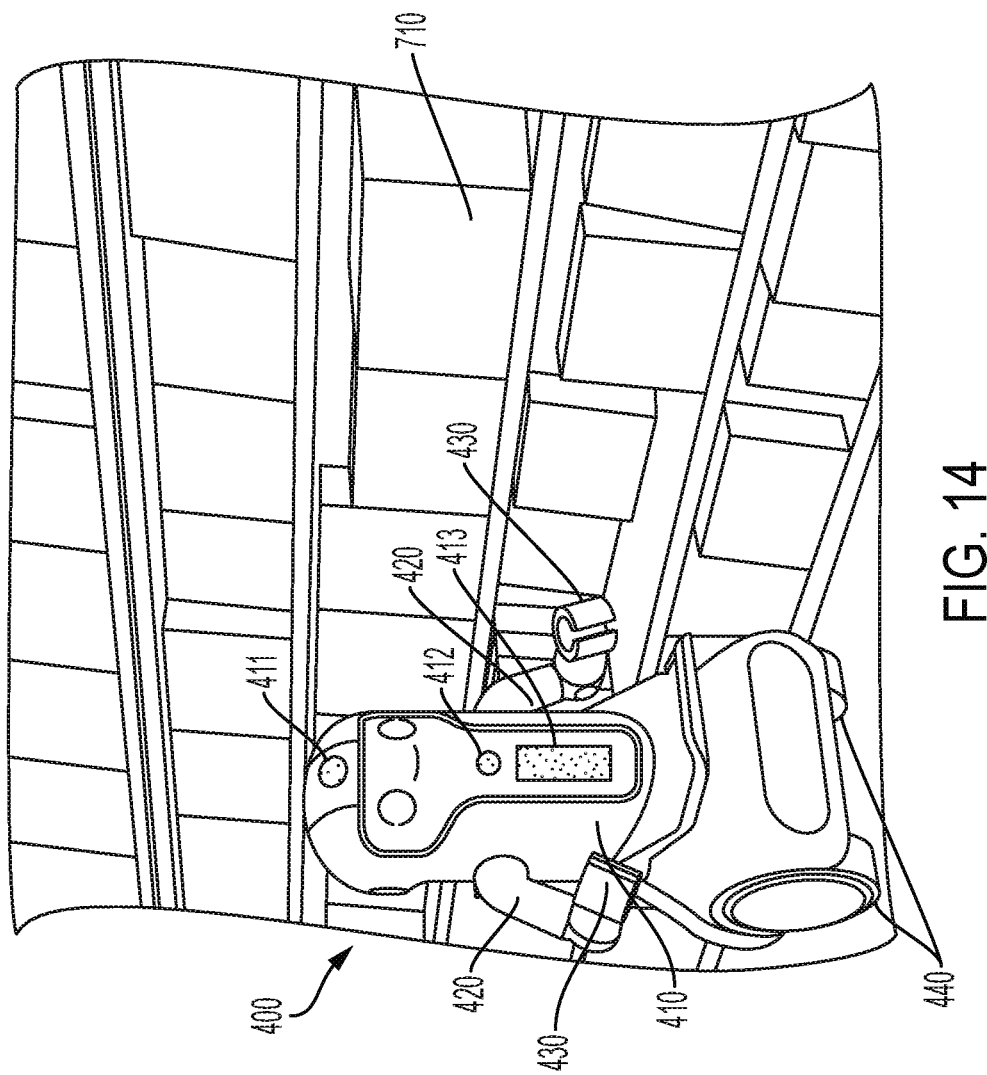
FIG. 14 illustrates a service robot performing assigned tasks in a third work environment according to embodiments of the present disclosure.

FIG. 14 illustrates a service robot performing assigned tasks in a third work environment (e.g., a retail store, a warehouse, or any other environments) according to embodiments of the present disclosure. For example, the service robot 400 may act as replacements for warehouse or retail store employees.

The service robot 400 illustrated in FIG. 14 may have substantially the same structure as the service robot 400 illustrated in FIG. 12.

With reference to FIGS. 11, 12, and 14, the service robot 400 may receive tasks through the input/output interface 330, such as the microphone 412, the touchpad 413, and/or a built-in wireless communication module. The service robot 400 may pre-store commands for performing tasks in the memory 320. Examples of the tasks may include finding items, reaching for shelves, and picking up or retrieving items from shelves.

For example, when the service robot 400 receives a command for retrieving an object 710 (e.g., a cereal box) from a shelf, the service robot 400 captures an RGB-D image of the object 710 using the camera 411, wherein the RGB-D image includes a pair of a grayscale image and a depth image of the object 710. The processor 310 may apply a foreground mask to the grayscale image and the depth image of the object 710, and may calculate a trajectory of the hand 430 of the service robot 400 to reach and pick up the object 710, by inputting the grayscale image and the depth image of the object 710 to the PTP neural network 233. The PTP neural network 233 may be trained based on a labeled trajectory of the hand 430 that is generated by a 3D motion planner using one or more 3D models of the object 710 (e.g., various 3D cloud models of cereal boxes). The service robot 400 may manipulate the arm 420 and the hand 430 to reach and pick up the object 710 from the shelf based on the calculated trajectory of the hand 430.

Figure 15:
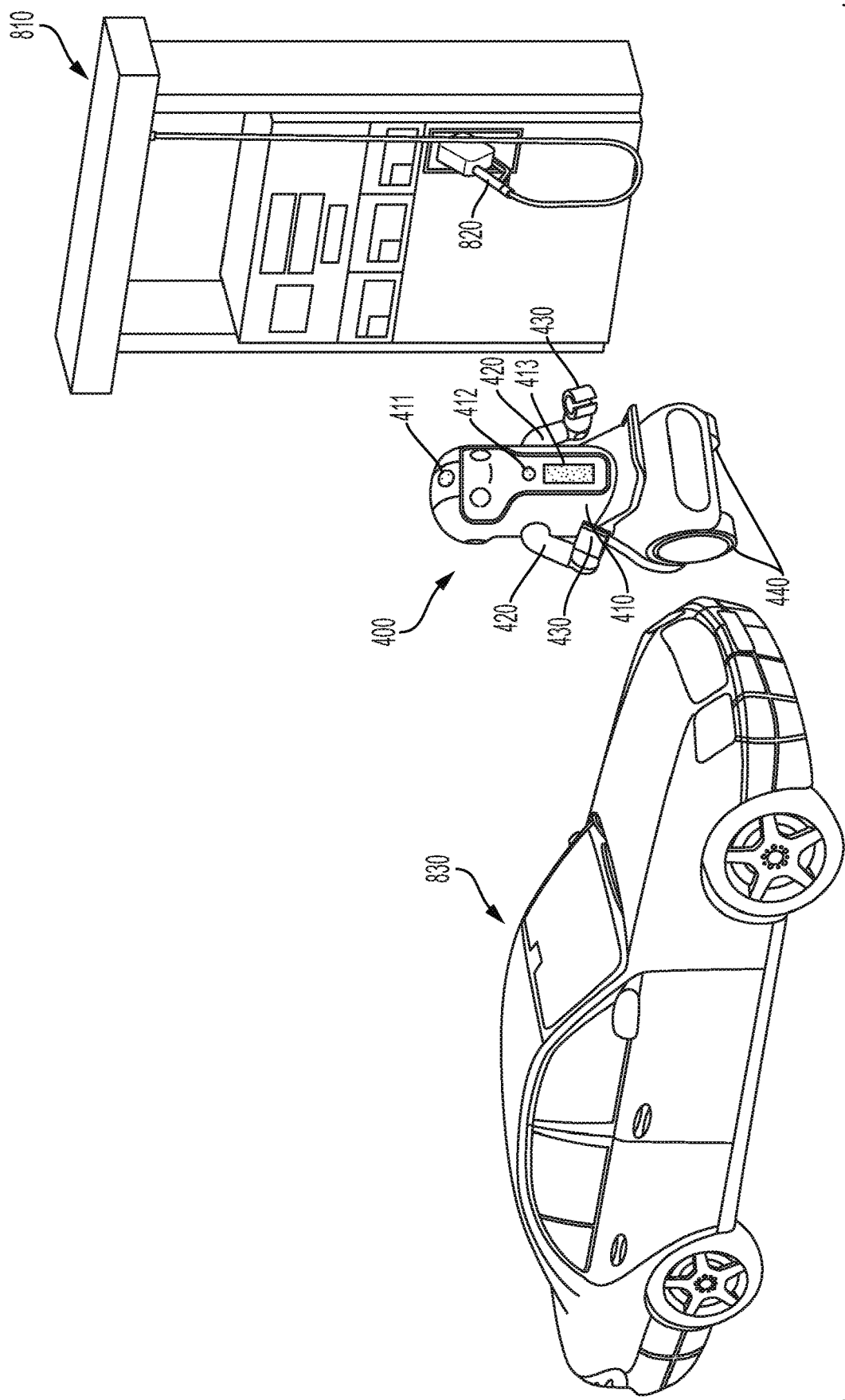
FIG. 15 illustrates a service robot performing assigned tasks in a fourth work environment according to embodiments of the present disclosure.

FIG. 15 illustrates a service robot performing assigned tasks in a fourth work environment (e.g., a gas station, or any other environments) according to embodiments of the present disclosure.

As shown in FIG. 15, the service robot 400 is located at a gas station. The gas station includes various service products, such as a fuel dispenser 810 having a fuel dispenser nozzle 820.

The service robot 400 illustrated in FIG. 15 may have substantially the same structure as the service robot 400 illustrated in FIG. 12.

With reference to FIGS. 11, 12, and 15, the service robot 400 may receive tasks through the input/output interface 330, such as the microphone 412, the touchpad 413, and/or a built-in wireless communication module. The service robot 400 may pre-store commands for performing tasks in the memory 320. Examples of the tasks may include removing the gas cap from a vehicle, removing the fuel dispenser nozzle 820 from the fuel dispenser 810 and inserting it into the gas tank opening of the vehicle, and pumping gas by pulling a trigger on the fuel dispenser nozzle 820.

For example, when a vehicle 830 is pulled up to the fuel dispenser 810, and a driver of the vehicle requests the service robot 400 to fill up the gas tank of the vehicle, the service robot 400 captures an RGB-D image of the fuel dispenser nozzle 820 using the camera 411, to obtain a pair of a grayscale image and a depth image of the fuel dispenser nozzle 820. The processor 310 may apply a foreground mask to the grayscale image and the depth image of the fuel dispenser nozzle 820, and may calculate a trajectory of the hand 430 of the service robot 400 to reach and pick up the fuel dispenser nozzle 820, by inputting the grayscale image and the depth image of the fuel dispenser nozzle 820 to the PTP neural network 233. The PTP neural network 233 may be trained based on a labeled trajectory of the hand 430 that is generated by a 3D motion planner using 3D models of various fuel dispenser nozzles, a 3D model of the hand 430, and a target position of the hand 430 with respect to the fuel dispenser nozzle 820 and/or various other fuel dispenser nozzles. The service robot 400 may manipulate the arm 420 and the hand 430 to reach and pick up the fuel dispenser nozzle 820 based on the calculated trajectory of the hand 430.

In other embodiments, the service robot 400 is located at a charging station for electric vehicles and operates in a manner similar to that described above for a gas station.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An apparatus for estimating a trajectory of a tool, the apparatus comprising:
    a memory storing instructions; and
    a processor configured to execute the instructions to:
        receive a task to be performed by the tool on a target object;
        receive a grayscale image and a depth image of the target object; and
        estimate a tool trajectory for performing the task, by processing the grayscale image and the depth image in separate streams, via a pixels-to-plans neural network that is trained based on a labeled tool trajectory that is generated from a three dimensional (3D) model of the target object.

2. The apparatus of claim 1, wherein the pixels-to-plans neural network comprises at least one convolutional layer and at least one fully connected layer, and the processor is further configured to execute the instructions to:
    process the grayscale image and the depth image through the at least one convolutional layer and the at least one fully connected layer to obtain the estimated tool trajectory.

3. The apparatus of claim 1, wherein the pixels-to-plans neural network comprises:
    a first dense convolutional network configured to receive and process the grayscale image, and
    a second dense convolutional network configured to receive and process the depth image,
    wherein the first dense convolutional network and the second dense convolutional network process the grayscale image and the depth image in the separate streams.

4. The apparatus of claim 3, wherein the pixels-to-plans neural network further comprises:
    a concatenation layer that combines first features output from the first dense convolutional network and second features output from the second dense convolutional network; and
    a fully connected layer configured to process the combined first and second features to output the estimated tool trajectory.

5. The apparatus of claim 4, wherein the fully connected layer comprises a plurality of hidden layers coupled with a rectified linear unit (ReLU) activation function.

6. The apparatus of claim 1, wherein the pixels-to-plans neural network is trained until a difference between the estimated tool trajectory and the labeled tool trajectory becomes less than a predetermined threshold value.

7. The apparatus of claim 1, wherein the labeled tool trajectory is generated from a point cloud model of the target object by a 3D motion planner.

8. The apparatus of claim 7, wherein the 3D motion planner is configured to generate the labeled tool trajectory using a rapidly exploring random tree (RRT) algorithm.

9. The apparatus of claim 7, wherein the 3D model of the target object is the point cloud model of the target object, and
    wherein the 3D motion planner is configured to generate the labeled tool trajectory based on the point cloud model of the target object, a 3D model of the tool, a target position for the tool with respect to the target object, and a pose of the target object.

10. The apparatus of claim 1, wherein the estimated tool trajectory is a tool trajectory from a position of a camera that captures the grayscale image and the depth image,
    wherein the processor is further configured to execute the instructions to:
        receive a camera-to-tool calibration value that indicates a relative position of the camera in relation to a position of the tool, and
        transform the tool trajectory in a camera frame to a tool trajectory in a tool frame, based on the camera-to-tool calibration value.

11. A method for estimating a trajectory of a tool, the method comprising:
    receiving a task to be performed by the tool on a target object;

receiving a grayscale image and a depth image of the target object; and estimating a tool trajectory for performing the task, by processing the grayscale image and the depth image in separate streams, via a pixels-to-plans neural network that is trained based on a labeled tool trajectory that is generated from a three dimensional (3D) model of the target object.

12. The method of claim 11, wherein the pixels-to-plans neural network comprises at least one convolutional layer and at least one fully connected layer, and wherein the estimating the tool trajectory comprises the estimating the tool trajectory by processing the grayscale image and the depth image through the at least one convolutional layer and the at least one fully connected layer.

13. The method of claim 11, wherein the pixels-to-plans neural network comprises: a first dense convolutional network and a second dense convolutional network, and wherein the estimating the tool trajectory comprises:

inputting the grayscale image to the first dense convolutional network;

inputting the depth image to the second dense convolutional network; and processing the grayscale image and the depth image through the first dense convolutional network and the second dense convolutional network, respectively, in the separate streams.

14. The method of claim 13, wherein the pixels-to-plans neural network further comprises: a concatenation layer and a fully connected layer, and wherein the estimating the tool trajectory further comprises:

inputting first features output from the first dense convolutional network and second features output from the second dense convolutional network, to the concatenation layer;

combining the first features and the second features; and inputting the combined first and second features to the fully connected layer and processing the combined first and second features by the fully connected layer to output the estimated tool trajectory.

15. The method of claim 14, wherein the processing the combined first and second features by the fully connected layer comprises processing the combined first and second features using a plurality of hidden layers coupled with a rectified linear unit (ReLU) activation function.

16. The method of claim 11, wherein the pixels-to-plans neural network is trained until a difference between the estimated tool trajectory and the labeled tool trajectory becomes less than a predetermined threshold value.

17. The method of claim 11, wherein the 3D model of the target object is a point cloud model of the target object, and the labeled tool trajectory is generated from the point cloud model of the target object by a three-dimensional (3D) motion planner that uses a rapidly exploring random tree (RRT) algorithm.

18. The method of claim 11, wherein the 3D model of the target object is a point cloud model of the target object, and wherein the labeled tool trajectory is generated by a three-dimensional (3D) motion planner based on the point cloud model of the target object, a 3D model of the tool, a target position for the tool with respect to the target object, and a pose of the target object.

19. The method of claim 11, wherein the estimated tool trajectory is a tool trajectory from a position of a camera that captures the grayscale image and the depth image, wherein the method further comprises:

receiving a camera-to-tool calibration value that indicates a relative position of the camera in relation to a position of the tool, and transforming the tool trajectory in a camera frame to a tool trajectory in a tool frame, based on the camera-to-tool calibration value.

20. A non-transitory computer-readable storage medium storing a program that is executable by a computer to perform the method for estimating the trajectory of the tool of claim 11.

21. A service robot comprising:

a camera configured to capture an image of an RGB-depth image of a target object;

an end-effector;

a memory storing instructions;

a processor configured to execute the instructions to:

receive a task to be performed by the service robot with respect to the target object;

receive the RGB-depth image of the target object from the camera; and estimate a trajectory of the end-effector for reaching the target object to perform the task, by processing the RGB-depth image of the target object in separate streams, via a pixels-to-plans neural network that is trained based on a labeled end-effector trajectory that is generated from a three dimensional (3D) model of the target object.

22. The service robot of claim 21, wherein the pixels-to-plans neural network comprises:

a first dense convolutional network configured to receive and process a grayscale image of the RGB-depth image, and a second dense convolutional network configured to receive and process a depth image of the RGB-depth image, wherein the first dense convolutional network and the second dense convolutional network process the grayscale image and the depth image in the separate streams.

23. The service robot of claim 22, wherein the pixels-to-plans neural network further comprises:

a concatenation layer that combines first features output from the first dense convolutional network and second features output from the second dense convolutional network; and a fully connected layer configured to process the combined first and second features to output the estimated tool trajectory.

24. The service robot of claim 21, wherein the labeled end-effector trajectory is generated by a three-dimensional (3D) motion planner, based on at least one of a point cloud model of the target object, a 3D model of the end-effector, and a target position for the end-effector with respect to the target object.

* * * * *

(12) EX PARTE REEXAMINATION CERTIFICATE (218th)
Ex Parte Reexamination Ordered under 35 U.S.C. 257

United States Patent
Tosun et al.

(10) Number: US 11,170,526 C1
(45) Certificate Issued: Mar. 22, 2023

(54) METHOD AND APPARATUS FOR ESTIMATING TOOL TRAJECTORIES

(71) Applicant: SAMSUNG ELECTRONICS CO., LTD., Suwon-si (KR)

(72) Inventors: Tarik Tosun, Brooklyn, NY (US); Eric Mitchell, Stanford, CA (US); Ben Eisner, New York, NY (US); Jinwook Huh, Millburn, NJ (US); Bhoram Lee, Princeton, NJ (US); Daewon Lee, Princeton, NJ (US); Volkan Isler, Saint Paul, MN (US); Sebastian Seung, Princeton, NJ (US); Daniel Lee, Tenafly, NJ (US)

(73) Assignee: SAMSUNG ELECTRONICS CO., LTD.

Supplemental Examination Request:
No. 96/000,392, Mar. 1, 2022

Reexamination Certificate for:
Patent No.: 11,170,526
Issued: Nov. 9, 2021
Appl. No.: 16/725,672
Filed: Dec. 23, 2019

Related U.S. Application Data

(60) Provisional application No. 62/824,200, filed on Mar. 26, 2019.

(51) Int. Cl.
*G06T 7/73* (2017.01)
*G06T 7/38* (2017.01)

(52) U.S. Cl.
CPC .................. *G06T 7/73* (2017.01); *G06T 7/38* (2017.01); *G06T 2207/20081* (2013.01); *G06T 2207/30241* (2013.01); *G06T 2207/30244* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,392, please refer to the USPTO's Patent Electronic System.

*Primary Examiner* — Eric B. Kiss

(57) ABSTRACT

An apparatus for estimating a trajectory of a tool may include: a memory storing instructions; and a processor configured to execute the instructions to: receive a task to be performed by the tool on a target object; receive a grayscale image and a depth image of the target object; and estimate a tool trajectory for performing the task, from the grayscale image and the depth image, via a pixels-to-plans neural network that is trained based on a labeled tool trajectory that is generated from a point cloud model of the target object.

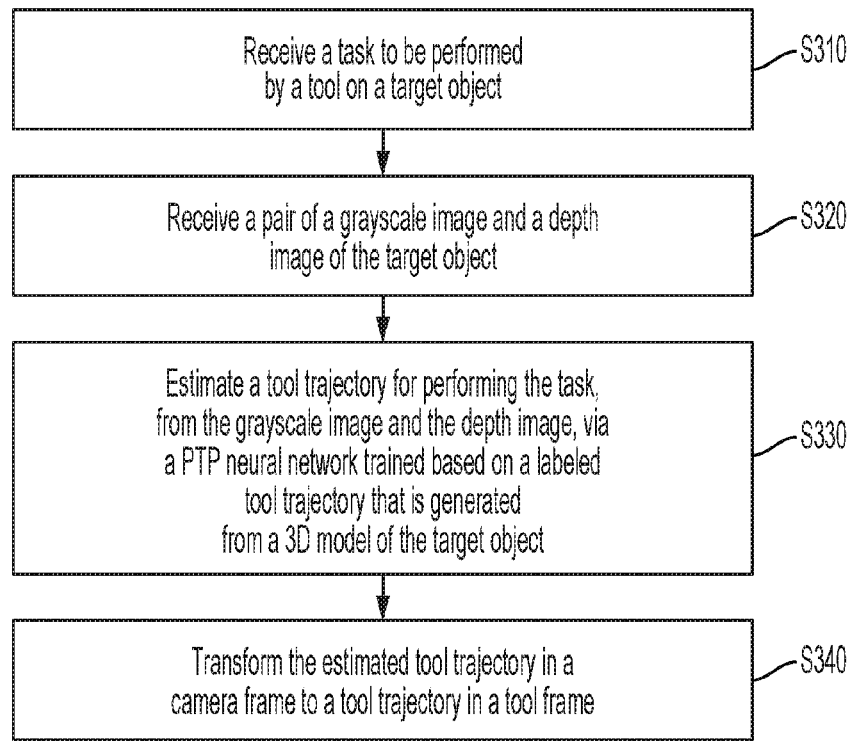

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-24 is confirmed.

* * * * *